US012802340B2

(12) United States Patent
Wang

(10) Patent No.: US 12,802,340 B2
(45) Date of Patent: Nov. 17, 2026

(54) VISIBLE ELEMENT DETERMINATION METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Qinjia Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 607 days.

(21) Appl. No.: 18/343,236

(22) Filed: Jun. 28, 2023

(65) Prior Publication Data

US 2023/0343021 A1 Oct. 26, 2023

Related U.S. Application Data

(63) Continuation of application No. PCT/CN2022/129514, filed on Nov. 3, 2022.

(30) Foreign Application Priority Data

Jan. 13, 2022 (CN) ......................... 202210037758.7

(51) Int. Cl.
*G06T 15/20* (2011.01)
*G06T 15/00* (2011.01)
*G06T 15/40* (2011.01)

(52) U.S. Cl.
CPC ............ *G06T 15/20* (2013.01); *G06T 15/005* (2013.01); *G06T 15/40* (2013.01)

(58) Field of Classification Search
CPC ....... G06T 15/20; G06T 15/005; G06T 15/40; G06T 15/00
See application file for complete search history.

(56) References Cited

U.S. PATENT DOCUMENTS

2005/0162435 A1 7/2005 Hashimoto et al.
2009/0033653 A1* 2/2009 Brown .................... G06T 15/06 345/419

(Continued)

FOREIGN PATENT DOCUMENTS

CN 109461199 A 3/2019
CN 111951342 A 11/2020

(Continued)

OTHER PUBLICATIONS

International Search Report for PCT/CN2022/129514 dated Jan. 20, 2023.
Written Opinion for PCT/CN2022/129514 dated Jan. 20, 2023.

*Primary Examiner* — Michelle Chin
(74) *Attorney, Agent, or Firm* — Sughrue Mion, PLLC

(57) ABSTRACT

A visible element determination method and apparatus are provided. The method may include rendering each scene element in a first scene element set under a target perspective to obtain a target rendering image. The method may further include determining the index of the scene element to which each pixel belongs according to the color value of each pixel in the target rendering image to obtain a target index set. The method may further include determining a second scene element set in the first scene element set, and determining scene elements in the second scene element set as visible elements under the target perspective, indexes of the scene elements in the second scene element set being included in indexes in the target index set.

16 Claims, 13 Drawing Sheets

(56) References Cited

U.S. PATENT DOCUMENTS

| | | | | |
|---|---|---|---|---|
| 2010/0060640 | A1* | 3/2010 | Melikian | G06T 15/20 345/427 |
| 2017/0109898 | A1* | 4/2017 | Koylazov | G06T 11/10 |
| 2021/0082185 | A1* | 3/2021 | Ziegler | G06T 15/50 |
| 2021/0209830 | A1* | 7/2021 | Burnett, III | G06T 15/005 |
| 2021/0383771 | A1* | 12/2021 | Buckley | G02B 27/017 |

FOREIGN PATENT DOCUMENTS

| | | | |
|---|---|---|---|
| CN | 113457161 | A | 10/2021 |
| CN | 113674389 | A | 11/2021 |
| CN | 114429513 | A | 5/2022 |

* cited by examiner

VISIBLE ELEMENT DETERMINATION METHOD AND APPARATUS, STORAGE MEDIUM, AND ELECTRONIC DEVICE

CROSS REFERENCE TO RELATED APPLICATION

This application is a continuation of International Application No. PCT/CN2022/129514, filed on Nov. 3, 2022, which claims priority to Chinese Patent Application No. 202210037758.7, filed with the China National Intellectual Property Administration on Jan. 13, 2022, the contents of which are incorporated by reference herein in their entirety.

FIELD

The disclosure relates to the field of computers, and in particular, to a visible element determination method and apparatus, a storage medium, and an electronic device.

BACKGROUND

In the field of graphics rendering research and industry applications, visibility determination is applied in the process of scene rendering performance optimization, ray casting, and the like. For example, a visible scene element set under a certain perspective is obtained in a three-dimensional scene.

Raster rendering is a commonly used visible set computing method. The main principle is to call a graphics processing unit (GPU) to render scene elements in the three-dimensional scene, and read a rendered frame buffer back to a central processing unit (CPU) for determination. However, a large number of data replication operations need to occupy CPU resources, thereby causing a long read-back time of frame buffer and a low computational efficiency of visible sets.

SUMMARY

An embodiment of the disclosure provides a visible element determination method and apparatus, a storage medium, and an electronic device.

According to one aspect of this embodiment of the disclosure, a visible element determination method is provided. The method is performed by at least one processor of an electronic device. The method may include rendering each scene element in a first scene element set under a target perspective to obtain a target rendering image, the first scene element set including to-be-rendered scene elements in a target scene under the target perspective, each scene element in the first scene element set having a corresponding index, and a color value of each pixel in the target rendering image being rendered according to an index of a scene element to which each pixel belongs. The method may further include determining the index of the scene element to which each pixel belongs according to the color value of each pixel in the target rendering image to obtain a target index set. The method may further include determining a second scene element set in the first scene element set, and determining scene elements in the second scene element set as visible elements under the target perspective, indexes of the scene elements in the second scene element set being included in indexes in the target index set.

According to another aspect of this embodiment of the disclosure, a visible element determination apparatus is provided. The apparatus may include at least one memory configured to store program code; and at least one processor configured to read the program code and operate as instructed by the program code. The program code may include rendering code configured to cause the at least one processor to render each scene element in a first scene element set under a target perspective to obtain a target rendering image, the first scene element set comprising to-be-rendered scene elements in a target scene under the target perspective, each scene element in the first scene element set having a corresponding index, and a color value of each pixel in the target rendering image being rendered according to an index of a scene element to which each pixel belongs. The program code may further include first determination code configured to cause the at least one processor to determine the index of the scene element to which each pixel belongs according to the color value of each pixel in the target rendering image to obtain a target index set. The program code may further include second determination code configured to cause the at least one processor to determine a second scene element set in the first scene element set. The program code may further include third determination code configured to cause the at least one processor to determine scene elements in the second scene element set as visible elements under the target perspective, indexes of the scene elements in the second scene element set being included in indexes in the target index set.

According to another aspect of this embodiment of the disclosure, a non-transitory computer-readable storage medium, storing a computer program is provided. The computer program when executed by at least one processor causes the at least one processor to render each scene element in a first scene element set under a target perspective to obtain a target rendering image, the first scene element set comprising to-be-rendered scene elements in a target scene under the target perspective, each scene element in the first scene element set having a corresponding index, and a color value of each pixel in the target rendering image being rendered according to an index of a scene element to which each pixel belongs. The computer program further causes the at least one processor to determine the index of the scene element to which each pixel belongs according to the color value of each pixel in the target rendering image to obtain a target index set. The computer program further causes the at least one processor to determine a second scene element set in the first scene element set. The computer program further causes the at least one processor to determine scene elements in the second scene element set as visible elements under the target perspective, indexes of the scene elements in the second scene element set being included in indexes in the target index set.

Details of one or more embodiments of the disclosure are provided in the accompanying drawings and descriptions below. Other features, objectives, and advantages of the disclosure become apparent from the specification, the drawings, and the claims.

BRIEF DESCRIPTION OF THE DRAWINGS

To describe the technical solutions of the embodiments of the disclosure more clearly, the following briefly introduces the accompanying drawings required for describing the embodiments. The accompanying drawings in the following description show only some embodiments of the disclosure, and those of ordinary skill in the art may still derive other drawings from these accompanying drawings.

DETAILED DESCRIPTION

In order to enable those skilled in the art to better understand the solutions of the disclosure, the following clearly and completely describes the technical solutions of the embodiments of the disclosure with reference to the accompanying drawings in the embodiments of the disclosure. The described embodiments are merely some rather than all of the embodiments of the disclosure. Based on the embodiments of the disclosure, all other embodiments obtained by those of ordinary skill in the art without creative efforts shall fall within the scope of protection of the disclosure.

The terms "first", "second" etc. in the specification and claims of the disclosure and in the above drawings are used for distinguishing between similar objects and not necessarily for describing a particular order or sequential order. It is to be understood that such used data is interchangeable where appropriate so that the embodiments of the disclosure described here may be implemented in an order other than those illustrated or described here. In addition, the terms "include", "have", and any other variants mean to cover the non-exclusive inclusion. For example, a process, method, system, product, or device that includes a list of operations or units is not necessarily limited to those operations or units, but may include other operations or units not expressly listed or inherent to such a process, method, product, or device.

A visible element determination method is provided. In some embodiments, the visible element determination method may be applied, but not limited, to an application environment shown in FIG. 1. The application environment includes a terminal device 101, a server 102, and a database 103.

In some embodiments, the terminal device may be a terminal device configured with a target client, and may include, but is not limited to, at least one of the following: a mobile phone (for example, an Android mobile phone, an iOS mobile phone, or the like), a laptop computer, a tablet computer, a palmtop computer, a mobile Internet device (MID), a PAD, a desktop computer, and a smart television. The target client may be a video client, an instant messaging client, a browser client, a game client, or the like. The network may include, but is not limited to: a wired network and a wireless network. The wired network includes: a local area network, a metropolitan area network and a wide area network. The wireless network includes: Bluetooth, WIFI, and other wireless communication networks. The server 102 may be a single server, a server cluster composed of a plurality of servers, or a cloud server. The database 103 is configured to store data, including but not limited to scene elements, rendering images, and the like in a three-dimensional scene. The foregoing is merely an example, and this embodiment is not limited thereto in any way.

Figure 2:
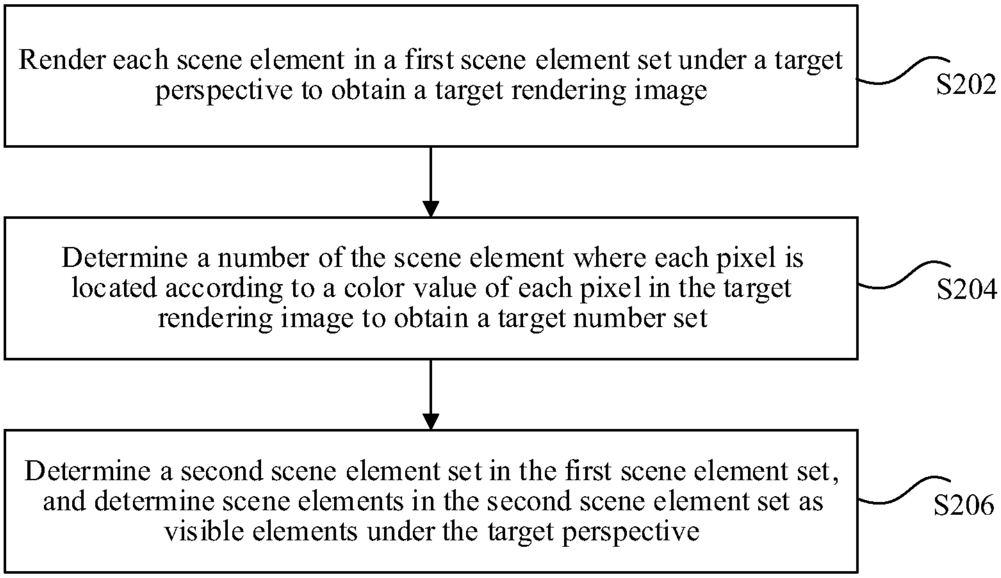
FIG. 2 is a flowchart of a visible element determination method according to some embodiments.

In some embodiments, as shown in FIG. 2, the visible element determination method includes the following operations:

Operation S202: Render each scene element in a first scene element set under a target perspective to obtain a target rendering image, the first scene element set including to-be-rendered scene elements in a target scene under the target perspective, each scene element having a corresponding number, and a color value of each pixel in the target rendering image being rendered according to the number of the scene element to which each pixel belongs.

The target scene includes, but is not limited to, a three-dimensional scene, for example, a three-dimensional game scene in a virtual game scene. The scene elements include, but are not limited to, spatial areas, scene models, model triangles, primitives, and the like in the three-dimensional scene, for example, virtual elements in the virtual game scene, virtual props, virtual characters, virtual objects, and the like. It is assumed that the three-dimensional scene under the target perspective includes N scene elements (the value of N may be determined according to actual situations, for example, 200, 300, 1000, or the like). The N scene elements have corresponding numbers. It is assumed that the numbers are 0 to N−1. The color value (three primary colors, abbreviated as RGB) of each scene element is obtained by coding according to the numbers of the scene elements. The following embodiment describes a specific coding mode. According to the corresponding color value of each scene element, the scene elements in the three-dimensional scene under the target perspective are rendered to obtain the target rendering image. In the process of rendering the scene elements in the three-dimensional scene under the target perspective, pixel colors of the scene elements that are invisible under the target perspective are not on the target rendering image. For example, the scene elements under the target perspective include A, B, and C. Assuming that A is blocked by B under the target perspective, there will be no color value of A in the target rendering image.

Operation S204: Determine the index (e.g. number or index number) of the scene element where each pixel is located according to the color value of each pixel in the target rendering image to obtain a target index set.

By decoding the color value of each pixel in the target rendering image, a code of the scene element where the pixel is located may be obtained, and then the scene element corresponding to the code is the visible element under the target perspective. Furthermore, by the color value of each pixel in the target rendering image, a visible scene element set under the target perspective may be determined.

Operation S206: Determine a second scene element set in the first scene element set, and determining scene elements in the second scene element set as visible elements under the target perspective, indexes of the scene elements in the second scene element set being the numbers in the target index set.

The color values of the scene elements are coded according to the numbers during rendering. According to the color value of each pixel of the target rendering image obtained by rendering, the number of the scene element where the pixel is located may be decoded. The scene element corresponding to the number is the visible element under the target perspective. Furthermore, by the color value of each pixel in the target rendering image, a visible scene element set under the target perspective, also referred to as a visible set (second scene element set), may be determined.

In the foregoing embodiment, each scene element in the three-dimensional scene is numbered, and when rendering the scene element under the target perspective, the color value of each scene element is a color obtained according to the number of the scene element. Through the color value of each pixel in the target rendering image obtained by rendering, the number of the scene element where each pixel is located in the target rendering image may be obtained, and then the visible scene element set under the target perspective may be determined according to the number. In this way, it is not necessary to read a rendered frame buffer back to a CPU, thus saving CPU resources, improving the computational efficiency of the visible scene element set, and further solving the technical problem of low computational efficiency of the visible scene element set.

In some embodiments, the execution entity of the visible element determination method may be a computational shader.

In some embodiments, the method further includes: before the rendering each scene element in a first scene element set under a target perspective to obtain a target rendering image, searching for scene elements within a range of the target perspective from the target scene to obtain the first scene element set.

Figure 3:
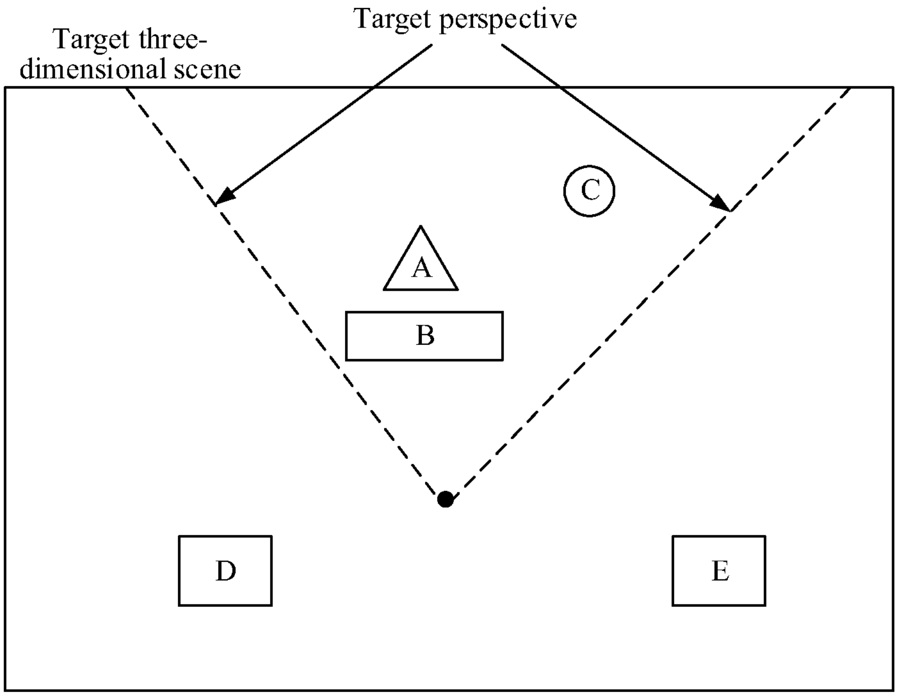
FIG. 3 is a schematic diagram of a target scene according to some embodiments.

In some embodiments, a target scene shown in FIG. 3 is taken as an example. The target scene shown in the figure includes scene elements A, B, C, D, and E. The scene elements A, B, and C are located within the range of the target perspective. The first scene element set includes the scene elements A, B, and C.

In the foregoing embodiment, by searching for the scene elements within the range of the target perspective from the target scene, the first scene element set may be quickly obtained, thereby improving the efficiency of obtaining the first scene element set.

In some embodiments, in the presence of blocked scene elements in the first scene element set under the target perspective, the target rendering image includes pixels in scene elements other than the blocked scene elements in the first scene element set.

In the foregoing embodiment, in the presence of the blocked scene elements in the first scene element set under the target perspective, the pixels in the scene elements other than the blocked scene elements in the first scene element set are taken as the pixels in the target rendering image, whereby the rendering effect of images may be improved.

In some embodiments, the operation of rendering each scene element in a first scene element set under a target perspective to obtain a target rendering image includes: determining, according to the number of each scene element in the first scene element set, a color value corresponding to each scene element, the scene elements with different numbers corresponding to different color values; determining, for each scene element, a color value of the pixel in the scene element according to the color value corresponding to the scene element; and determining a corresponding storage position of each scene element in a target storage space according to a position of each scene element under the target perspective, and storing the color value of the pixel in each scene element to the corresponding storage position in the target storage space, the color value of the pixel stored in the target storage space being the color value of the pixel in the target rendering image.

In the foregoing embodiment, by determining the color value of the pixel in the scene element according to the color value corresponding to the scene element, the computational efficiency of color values of pixels in images may be improved. Furthermore, by determining the corresponding storage position of each scene element in the target storage space according to the position of each scene element under the target perspective and storing the color value of the pixel in each scene element to the corresponding storage position in the target storage space, the image rendering efficiency may be further improved.

In some embodiments, in the presence of a first scene element and a second scene element in each scene element and in a case that the position of the first scene element under the target perspective is blocked by the position of the second scene element under the target perspective, the color value of the pixel in the first scene element stored in the target storage space is covered by the color value of the pixel in the second scene element.

In some embodiments, assuming that the first scene element set includes N scene elements, the N scene elements are numbered from 0 to n−1. Each number is taken as an index of the scene element, and a color value of each scene element is coded according to the index of each scene element to obtain a corresponding color value of the scene element. The coding formula is as follows:

$$\begin{cases} \text{color}_{red}(\text{index}) = (\text{index}+1)\bmod h \\ \text{color}_{green}(\text{index}) = \left(\dfrac{\text{index}+1}{h}\right)\bmod h \\ \text{color}_{blue}(\text{index}) = \left(\dfrac{\text{index}+1}{h^2}\right)\bmod h \end{cases} \tag{1}$$

where $\text{color}_{red}(\text{index})$, $\text{color}_{green}(\text{index})$, and $\text{color}_{blue}(\text{index})$ are a color value of three primary colors RGB of the scene element corresponding to the index. That is, the color value includes $\text{color}_{red}(\text{index})$, $\text{color}_{green}(\text{index})$, and $\text{color}_{blue}(\text{index})$, and mod is the remainder operation. h is a preset parameter, which may be set according to actual situations, for example, as 128, 256, 512, and the like. It may be seen from the foregoing coding formula that scene elements with different numbers are coded to obtain different color values. A scene element corresponds to a number, a number corresponds to a color value, and a scene element corresponds to a color value. That is, a scene element has a color.

In some embodiments, the target scene shown in FIG. 3 is taken as an example. The first scene element set includes scene elements A, B, and C. The scene elements A, B, and C are numbered. It is assumed that the number of A is 0, the number of B is 1, and the number of C is 2. The foregoing coding formula is adopted to obtain a color value of the scene element A ($color_{red}$ (0) $color_{green}$(0), $color_{blue}$(0)), a color value of the scene element B ($color_{red}$(1), $color_{green}$(1), $color_{blue}$(1)), and a color value of the scene element A ($color_{red}$(2), $color_{green}$(2), $color_{blue}$(2)).

In some embodiments, if the scene element is a model, a material rendered by the model is set as a solid color material without illumination, and a color used by the material is set as a corresponding color value. If the scene element is a primitive, a proxy model is set according to an original model, and a vertex color of each primitive is set as a corresponding color value. And the material used by the proxy model is set as a vertex color without illumination. An unblocked blocker model (which is unblocked and blocks other models) may adopt a pure black material without illumination. When the foregoing material is set, a back elimination switch may be set as a material back elimination switch of the original model.

In some embodiments, a frame buffer is emptied during the rendering stage, and the anti-aliasing, high dynamic range and post-processing functions are turned off to avoid affecting the rendering result. In some embodiments, the target storage space may be the frame buffer. In the frame buffer, the scene elements in the first scene element set are rendered, and the color value of the pixel of each scene element is stored to the corresponding storage position according to the position of each scene element in the first scene element set under the target perspective.

Figure 4:
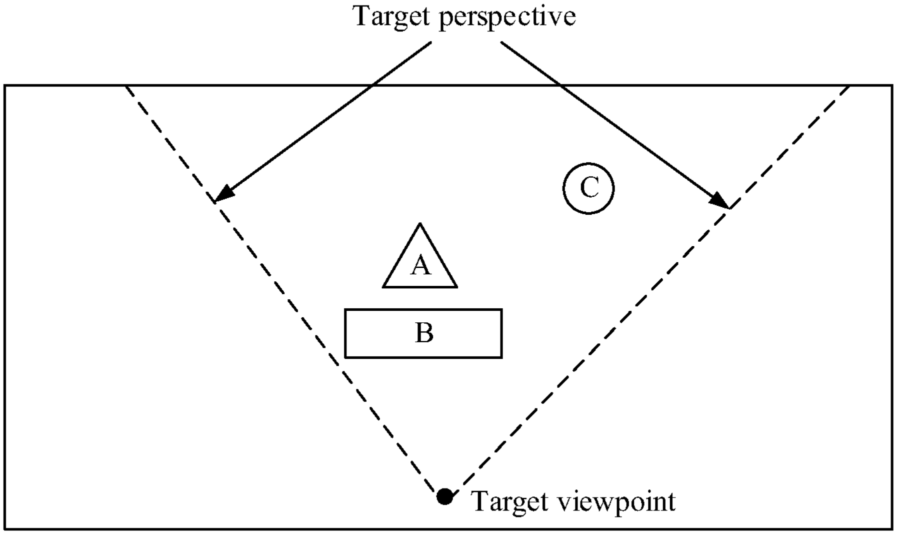
FIG. 4 is a schematic diagram of a target perspective according to some embodiments.

In some embodiments, when each scene element is rendered in the frame buffer, each scene element is rendered according to a target rendering order. The target rendering order is related to distances between the scene elements and a target viewpoint. The scene element farther away from the target viewpoint is top ranked. The scene elements A, B, and C shown in FIG. 4 are taken as an example. The distance between the scene elements A, B, and C and the target viewpoint is C, A, and B from far to near. The rendering order in the rendering stage is C, A, and B.

Under the target perspective shown in FIG. 4, the first scene element A is blocked by the second scene element B since the distance between A and the target viewpoint is greater than the distance between B and the target viewpoint. A is rendered before B during rendering. That is, the color value of the pixel of the scene element A is first stored to the corresponding storage position of the target storage space, and then the color value of the scene element B is stored to the corresponding position of the target storage space, since the storage positions overlap. After rendering the scene element B, the color value of the scene element A is covered by the color value of the scene element B, and the color value of the scene element A does not exist in the target storage space. In the rendering process shown in FIG. 5, color (2) is the color value of the scene element C, including ($color_{red}$(2), $color_{green}$(2), $color_{blue}$(2)), color (0) is the color value of the scene element A, including ($color_{red}$(0), $color_{green}$(0), $color_{blue}$(0)), and color (1) is the color value of the scene element B, including ($color_{red}$(1), $color_{green}$(1) $color_{blue}$(1)). In the rendering process of the scene elements as shown in the figure, the color value of the scene element C is first stored to a corresponding storage position 500 of the target storage space, then the color value of the scene element A is stored to a corresponding storage position 501 of the target storage space, and finally the color value of the scene element B is stored to a corresponding storage position 501 of the target storage space. Since the scene element B and the scene element A overlap under the target perspective at the storage position in the target storage space, the overlapping storage position is 501, and the color value of the scene element B overlaps the color value of the scene element A in the target storage space. The scene element A does not exist in the rendered target rendering image, and the color value of the scene element A does not exist in the target storage space.

In the foregoing embodiment, the color value of the pixel in the blocked first scene element is covered by the color value of the pixel in the second scene element, whereby the image rendering effect may be further improved.

In some embodiments, the operation of determining a corresponding storage position of each scene element in a target storage space according to a position of each scene element under the target perspective and storing the color value of the pixel in each scene element to the corresponding storage position in the target storage space includes: performing the following operations in which each scene element is a current scene element and a position of the current scene element under the target perspective is a current position on each scene element in the first scene element set: searching for a current storage position corresponding to the current position from the target storage space; covering, in a case that the color value of the pixel in a scene element has been stored in the current storage position, the stored color value of the pixel in the scene element into the color value of the pixel in the current scene element at the current storage position, the position of the scene element under the target perspective being blocked by the position of the current scene element under the target perspective; and storing the color value of the pixel in the current scene element to the current storage position in a case that the color value of the pixel in any scene element is not stored at the current storage position.

Figure 5:
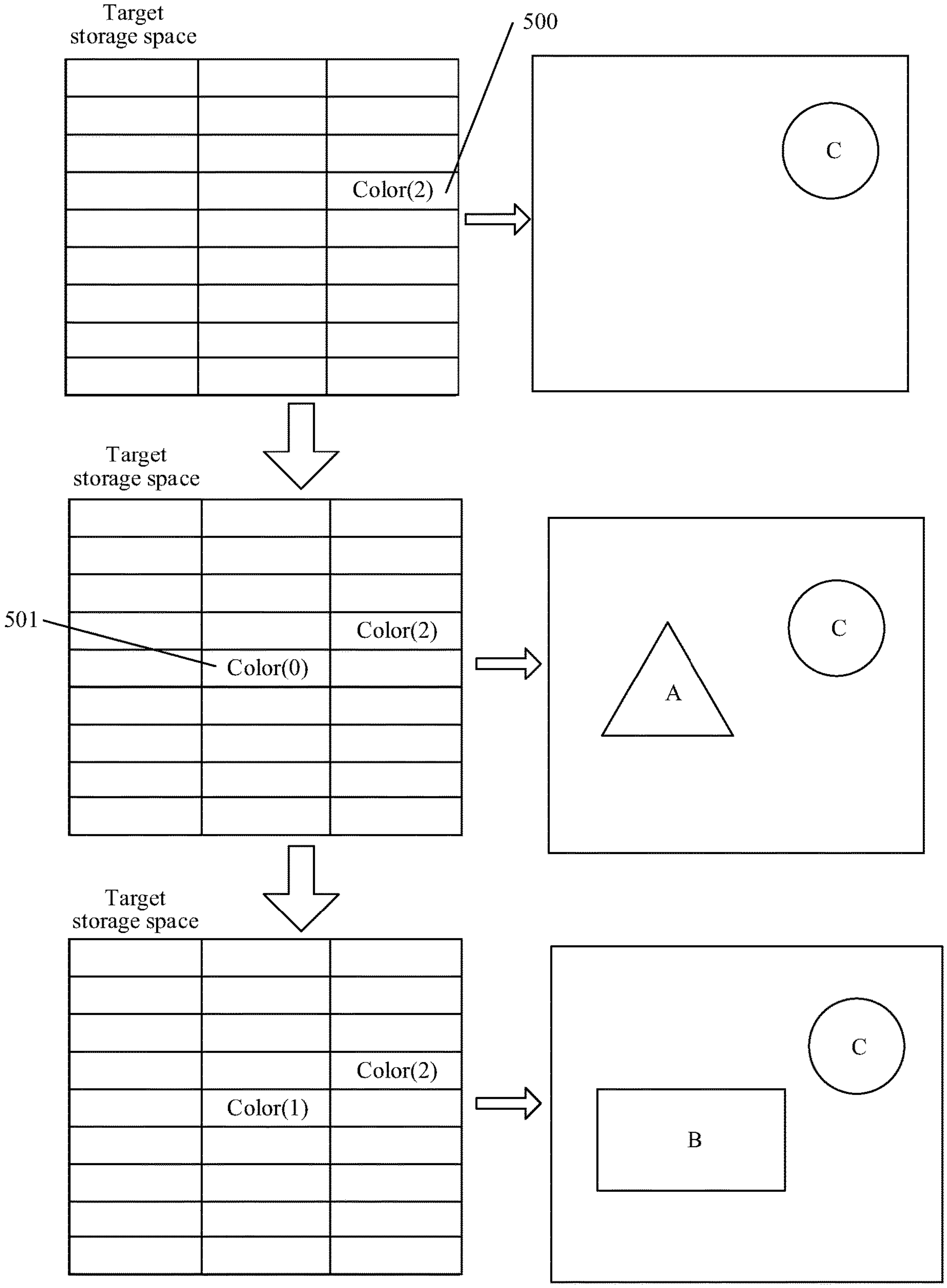
FIG. 5 is a schematic diagram of a target storage space according to some embodiments.

In some embodiments, in the rendering process of the model elements as shown in FIG. 5, the model elements are rendered in the rendering order of C, A, and B. When rendering the scene element A, the color value of the scene element A is stored to the storage position 501 of the target storage space. If no value is stored at the storage position 501, the color value color (0) is stored to the storage position 501 (current storage position) of the target storage space.

When rendering the scene element B, the storage position of the scene element B in the target storage space is 501, and the storage position 501 has stored the color value color (0) of the scene element A. Then the color value color (1) of the scene element B covers the color value color (0) of the scene element A, the color value color (1) of the scene element B is stored at the storage position 501, and the color value color (0) of the scene element A is not stored at the storage position 501.

First, the color value of the model element C is stored to the corresponding storage position of the target storage space, then the color value of the scene element A is stored to the corresponding storage position of the target storage space, and finally the color value of the scene element B is stored to the corresponding storage position of the target storage space. Since the scene element B and the scene element A overlap under the target perspective at the storage position in the target storage space, the color value of the scene element B overlaps the color value of the scene element A in the target storage space. The scene element A does not exist in the rendered target rendering image, and the color value of the scene element A does not exist in the target storage space.

In the foregoing embodiment, in a case that the color value of the pixel in a scene element has been stored in the current storage position, the stored color value of the pixel in the scene element is covered into the color value of the pixel in the current scene element at the current storage position, thereby avoiding rendering the blocked scene element into an image. In a case that the color value of the pixel in any scene element is not stored at the current storage position, it is indicated that the current scene element is not blocked by other scene elements. At this moment, the color value of the pixel in the current scene element is stored to the current storage position, thereby accurately rendering the current scene element into the image, and further improving the image rendering effect.

In some embodiments, the operation of determining, according to the number of each scene element in the first scene element set, a color value corresponding to each scene element includes: performing the following operations in which each scene element is a current scene element on each scene element in the first scene element set: obtaining a number of the current scene element; and performing a logical operation on the number of the current scene element to obtain the color value corresponding to the current scene element.

In some embodiments, the logical operation is the following coding formula:

$$\begin{cases} \text{color}_{red}(\text{index}) = (\text{index}+1)\bmod h \\ \text{color}_{green}(\text{index}) = \left(\dfrac{\text{index}+1}{h}\right)\bmod h \\ \text{color}_{blue}(\text{index}) = \left(\dfrac{\text{index}+1}{h^2}\right)\bmod h \end{cases} \quad (2)$$

where index is the number of the current scene element, and the corresponding color value includes $\text{color}_{red}$(index), $\text{color}_{green}$(index), and $\text{color}_{blue}$(index). h is a preset parameter, which may be set according to actual situations, for example, as 128, 256, 512, and the like.

In the foregoing embodiment, by obtaining the number of the current scene element and performing the logical operation on the number of the current scene element, the color value corresponding to the current scene element may be obtained, thereby improving the computational accuracy of the color value of the current scene element, and further improving the image rendering efficiency.

In some embodiments, the operation of determining the number of the scene element where each pixel is located according to the color value of each pixel in the target rendering image to obtain a target index set includes: performing the following operations in which each pixel is a current pixel on the color value of each pixel stored in the target storage space: performing an inverse logical operation corresponding to the logical operation on the color value of the current pixel to obtain the number of the scene element where the current pixel is located.

In some embodiments, the inverse logical operation is a decoding operation, and a decoding equation is:

$$\text{index}=\text{color}_{blue}\times h^2+\text{color}_{green}\times h+\text{color}_{red}-1 \quad (3)$$

where $\text{color}_{blue}$, $\text{color}_{green}$ and $\text{color}_{red}$ are the color value of the pixel, and index is the number of the scene element where the pixel is located. h is the same as h in the foregoing coding formula, which may be determined according to actual situations as, for example, 128, 256, 512, and the like.

In the foregoing embodiment, by performing the inverse logical operation corresponding to the logical operation on the color value of the current pixel, the number of the scene element where the current pixel is located may be quickly obtained, thereby improving the efficiency of obtaining the number of the scene element, and further improving the computational efficiency of the visible scene element set.

In some embodiments, the operation of determining the number of the scene element where each pixel is located according to the color value of each pixel in the target rendering image to obtain a target index set includes: obtaining the color values of the pixels in the target rendering image in parallel through a target thread set, and determining the numbers of the scene elements in which the obtained color values of the pixels are located according to the obtained color values of the pixels, the target rendering image including a plurality of image blocks, and each thread in the target thread set being used for reading the color value of the pixel in the image block in the target rendering image every time.

Figure 6:
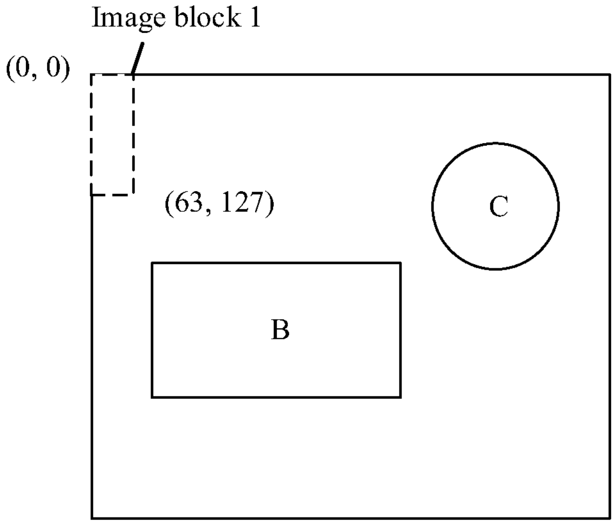
FIG. 6 is a schematic diagram of an image block according to some embodiments.

In some embodiments, the target thread set is Ts, the width and height of Ts may be (64, 16), and the total number of parallel threads is 64×16×1=1024. It is assumed that the frame buffer has a width W of 4096 pixels and a height H of 2048 pixels. That is, the width of the target rendering image is 4096 pixels, and the height is 2048 pixels, which are integer multiples of 64 and 16, respectively. The target rendering image is allocated into individual picture blocks according to the width and height (64, 16) of Ts. The size of each image block is: (W, H)/(64, 16). The size of each image block is (64, 128). As shown in FIG. 6, for threads (0, 0, 0) in the target thread set, image blocks 1 to be processed are (0, 0) to (63, 127). Each thread in the target thread set needs to traverse elements in the corresponding image block, load the color value of each pixel, and decode the number index of the scene element where each pixel is located by the foregoing decoding equation. And all pixels in the target rendering image are traversed.

In the foregoing embodiment, each thread in the target thread set obtains the color value of each pixel of each image block in the target rendering image in parallel, whereby the efficiency of obtaining the color value of each pixel in the target rendering image may be improved. Furthermore, the number of the scene element where the obtained color value of the pixel is located is determined through the obtained color value of the pixel, so as to further improve the efficiency of obtaining the number of the scene element.

In some embodiments, the operation of determining scene elements in the second scene element set as visible elements under the target perspective includes: determining, in a case that the second scene element set is a second model set and each scene element in the second scene element set is each model in the second model set, each model in the second model set as the visible model under the target perspective.

In the foregoing embodiment, in a case that the second scene element set is a second model set and each scene element in the second scene element set is each model in the second model set, each model in the second model set is directly determined as the visible model under the target perspective, thereby improving the computational efficiency of the visible model.

In some embodiments, the visible element includes a visible primitive. The operation of determining scene elements in the second scene element set as visible elements under the target perspective includes: determining, in a case that the second scene element set is a second primitive set and each scene element in the second scene element set is each primitive in the second primitive set, each primitive in the second primitive set as the visible primitive under the target perspective.

In the foregoing embodiment, in a case that the second scene element set is a second primitive set and each scene element in the second scene element set is each primitive in the second primitive set, each primitive in the second primitive set is directly determined as the visible primitive under the target perspective, thereby improving the computational efficiency of the visible primitive.

In some embodiments, the operation of rendering each scene element in a first scene element set under a target perspective to obtain a target rendering image includes: determining, in a case that the first scene element set is a first model set and each scene element in the first scene element set is each model in the first model set, a color value corresponding to each model in the first model set according to a number of each model, the models with different numbers corresponding to different color values; and determining the target rendering image according to the color value corresponding to each model in the first model set and the position of each model under the target perspective.

In the foregoing embodiment, the color value corresponding to each model in the first model set is directly determined by the number of each model, whereby the computational efficiency of the color value corresponding to the model may be improved. Furthermore, the target rendering image is directly determined according to the color value corresponding to each model in the first model set and the position of each model under the target perspective, thereby improving the rendering efficiency of the target rendering image.

In some embodiments, the operation of rendering each scene element in a first scene element set under a target perspective to obtain a target rendering image includes: determining, in a case that the first scene element set is a first primitive set and each scene element in the first scene element set is each primitive in the first primitive set, a color value corresponding to each primitive in the first primitive set according to a number of each primitive, the primitives with different numbers corresponding to different color values; and determining the target rendering image according to the color value corresponding to each primitive in the first primitive set and the position of each primitive under the target perspective.

In the foregoing embodiment, the color value corresponding to each primitive in the first primitive set is directly determined by the number of each primitive, whereby the computational efficiency of the color value corresponding to the primitive may be improved. Furthermore, the target rendering image is directly determined according to the color value corresponding to each primitive in the first primitive set and the position of each primitive under the target perspective, thereby improving the rendering efficiency of the target rendering image.

In some embodiments, the method is performed by a computational shader in the electronic device. In response to determining scene elements in the second scene element set as visible elements under the target perspective, the method further includes: setting a value of each unit in a first unit set corresponding to the second scene element set in a preset first array as a first value, and setting a value of a unit other than the first unit set in the first array as a second value, the quantity of units in the first array being the quantity of scene elements in the first scene element set, the units in the first array and the scene elements in the first scene element set having a one-to-one correspondence relationship, the unit with the first value indicating that the corresponding scene element is the visible element under the target perspective, and the unit with the second value indicating that the corresponding scene element is an invisible element under the target perspective; and transmitting the first array to a target processing device in the electronic device through the computational shader.

In the foregoing embodiment, the value of each unit in the first unit set corresponding to the second scene element set in the preset first array is set as the first value, and the unit with the first value indicates that the corresponding scene element is the visible element under the target perspective. The value of the unit other than the first unit set in the first array is set as the second value, and the unit with the second value indicates that the corresponding scene element is the invisible element under the target perspective. Furthermore, the first array is transmitted to the target processing device in the electronic device through the computational shader. In this way, the visible scene element set may be directly computed in the computational shader, thereby avoiding reading the rendered frame buffer back to the CPU and saving CPU resources.

In some embodiments, the method is performed by a computational shader in the electronic device. In response to determining scene elements in the second scene element set as visible elements under the target perspective, the method further includes: setting a value of each unit in a first unit set corresponding to the second scene element set in a preset second array as a first value, setting a value of a unit other than the first unit set in a second unit set as a second value, and setting a value of a unit other than the second unit set in the second array as a third value, the second unit set being a unit set corresponding to the first scene element set in the second array, the second unit set including the first unit set, the quantity of units in the second array being the quantity of scene elements in the target scene, the units in the second array and the scene elements in the target scene having a one-to-one correspondence relationship, the unit with the first value indicating that the corresponding scene element is the visible element under the target perspective, the unit with the second value indicating that the corresponding scene element is an invisible element under the target perspective, and the unit with the third value indicating that the corresponding scene element is not within the range of the target perspective; and transmitting the second array to the target processing device in the electronic device through the computational shader.

Figure 7:
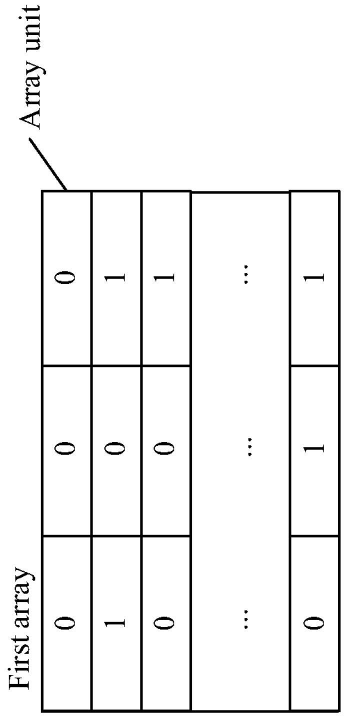
FIG. 7 is a schematic diagram of an array according to some embodiments.

In some embodiments, the first array is an array S, and the units in the first unit set are array units in the first array, such as SM. The first value is 1, and the second value is 0. The quantity of units included in the first array is the quantity of scene elements in the first scene element set, that is, the quantity of scene elements within the range of the target perspective. Assuming that 1024 scene elements are included in the first scene element set, 1024 array units are included in the first array. Each array unit corresponds to one scene element. As shown in FIG. 7, a value in the array unit S[i] corresponding to a visible scene element (number i) is a first value 1, and a value in the array unit S[j] corresponding to an invisible scene element (number j) is a second value 0.

Figure 8:
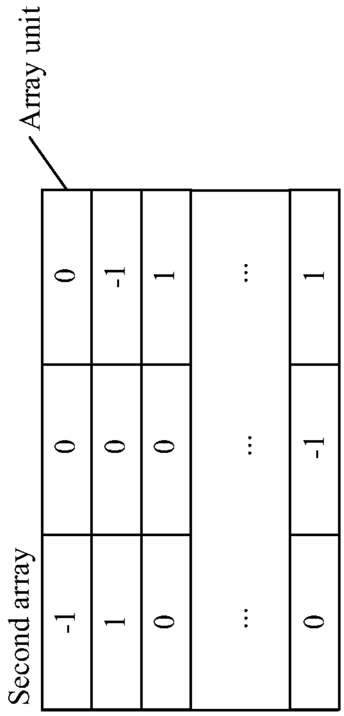
FIG. 8 is a schematic diagram of another array according to some embodiments.

In some embodiments, for the second array S, the first value is 1, the second value is 0, and the third value may be −1. The quantity of units included in the second array is the quantity of scene elements in the target scene (greater than or equal to the quantity of scene elements within the range of the target perspective (the quantity in the first scene element set)). Assuming that the quantity of scene elements in the three-dimensional scene is 2028, the first array includes 2028 array units. Each array unit corresponds to one scene element in the target scene. Assuming that 1024 scene elements are included in the first scene element set, 1024 array units included in the second unit set in the second array S correspond to the 1024 scene elements in the first scene element set, respectively. The first scene element set includes visible scene elements and invisible scene elements. The visible scene elements in the first scene element set correspond to the first unit set in the second array. The value of each unit in the first unit set is 1. The value of the array unit corresponding to the visible scene elements shown in FIG. 8 is 1. The invisible scene elements in the first scene element set correspond to other array units other than the first unit set in the second unit set, and have a value of 0. The value of the array unit corresponding to the invisible scene elements as shown in FIG. 8 is 0. The value of the array units other than the second unit set corresponding to the first scene element set in the array as shown in FIG. 8 is set as −1.

In some embodiments, the target processing device is a CPU, and the first array and the second array are transmitted to the CPU by the computational shader.

In some embodiments, in the initialization stage of the computational shader, the thread width of the computational shader is first defined as Ts=(64, 16, 1), and the total number of parallel threads is 64×16×1=1024. The quantity n of working tasks may be aligned to the width of 1024, and set as n', including:

$$n' = \begin{cases} n, & n \bmod 1024 = 0 \\ 1024 - n \bmod 1024 + n, & n \bmod 1024 \neq 0 \end{cases} \tag{4}$$

A new array S with an unsigned integer data type and a length of n' is created to store visibility. mod is the remainder operation, and the quantity of primitives/models n, the aligned quantity n' and the array S are transmitted to the computational shader. The array S is initialized by calling an empty data kernel function of the computational shader.

In the empty data kernel function, the width of a working thread is consistent with Ts, and the input of the kernel function is a three-dimensional unsigned integer variable Coord. If the total quantity of working threads is 1024 and the quantity of working tasks is n', the amount of working of each thread is Stripe=n'/1024. That is, a thread (0, 0, 0) needs to empty elements 0 to Stripe−1 of the array S, a thread (1, 0, 0) needs to empty elements Stripe to 2×Stripe−1 of the array S, and so on. That is, the working thread numbered as Coord needs to be assigned: S[i]=0. After the kernel function is executed, all of the n' elements in the array S are set as 0.

$$Coord \cdot x \times \frac{n'}{64 \times 16} + Coord \cdot y \times \frac{n'}{64} \leq i \leq (Coord \cdot x + 1) \times \frac{n'}{64 \times 16} + Coord \cdot y \times \frac{n'}{64} - 1 \tag{5}$$

In the stage of obtaining visible sets in parallel, another kernel function is defined to compute the visible sets in the computational shader. Tasks with a width of W and a height of H are allocated into various picture blocks according to the width and height (64, 16) of Ts, and the size of each block is: (W, H)/(64, 16). Each thread needs to traverse the corresponding image block, load the color value of each pixel, and decode with a decoding equation $$\text{index}=\text{color}_{blue}\times 2562+\text{color}_{green}\times 256+\text{color}_{red}-1 \tag{6}.$$

If the index is less than n, S[index] is equal to 1. And all pixels are traversed.

The computational shader reads the visible set S back into an internal memory, and the CPU determines the elements therein. A value of 0 represents that the element is invisible, and a value of 1 represents that the element is visible.

In the foregoing embodiment, the value of each unit in the first unit set corresponding to the second scene element set in the preset second array is set as the first value, and the unit with the first value indicates that the corresponding scene element is the visible element under the target perspective. The value of the unit other than the first unit set in the second unit set is set as the second value, and the unit with the second value indicates that the corresponding scene element is the invisible element under the target perspective. The value of the unit other than the second unit set in the second array is set as the third value, and the unit with the third value indicates that the corresponding scene element is not within the range of the target perspective. Furthermore, the second array is transmitted to the target processing device in the electronic device through the computational shader. In this way, the visible scene element set may be directly computed in the computational shader, thereby avoiding reading the rendered frame buffer back to the CPU and saving CPU resources.

Figure 9:
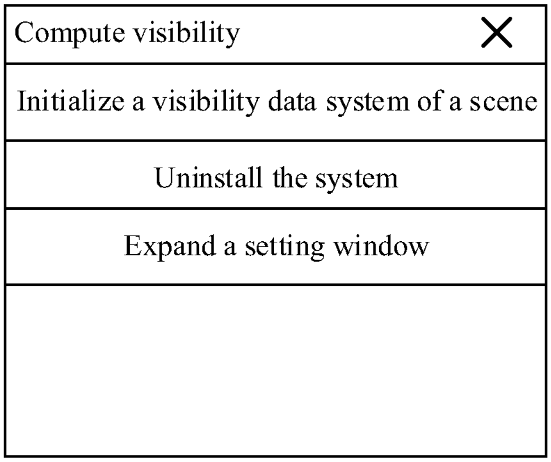
FIG. 9 is a schematic diagram of a development interface according to some embodiments.
Figure 10:
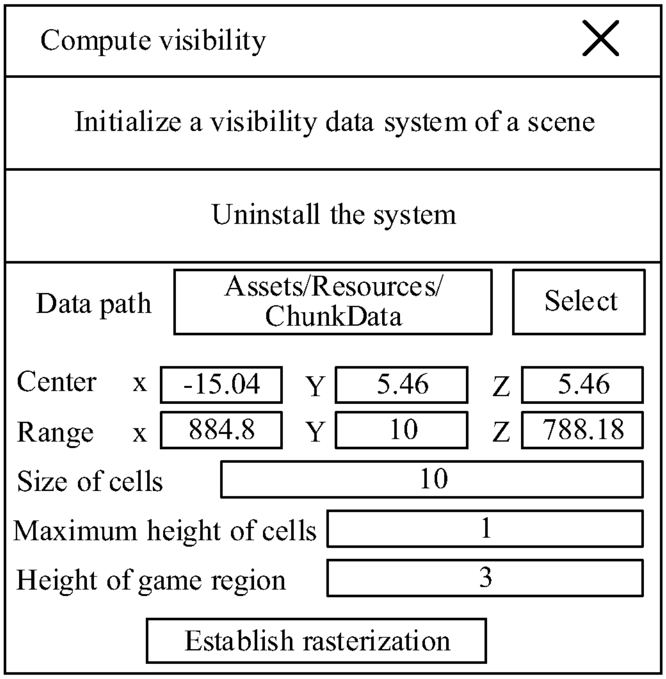
FIG. 10 is a schematic diagram of another development interface according to some embodiments.

In some embodiments, a graphics rendering development process may be supported in the form of a Unity tool plug-in. In a development interface shown in FIG. 9, a first button is used for initializing a visibility data system of the scene, a second button is used for uninstalling the system, and the third button may be used for expanding a setting window. The interface to expand the setting window is shown in FIG. 10. In the interface shown in FIG. 10, a developer may set a position, setting region, and computational density of a visible set to be computed. A build button at the bottom is clicked/tapped to start generating the visible set. The developer may also write scripts, call plug-ins to render and obtain the visible set flexibly, and then carry out subsequent processing according to requirements. The plug-in provides a method for debugging intermediate results, and the developer may still choose to read back the frame buffer as a texture to check the current color of the frame buffer.

In some embodiments, the example of rendering scene elements in a virtual game scene may include the following operations:

S1: Render virtual scene elements in the virtual game scene under the target perspective to obtain a virtual game scene map under the target perspective. The virtual scene elements include, but are not limited to, virtual elements in the virtual game scene, such as virtual characters, virtual props, and virtual objects.

In the rendering process, the virtual scene elements under the target perspective are numbered, and the numbering mode may be set according to actual situations. For example, the number may be 1, 2, 3, and the like. During rendering, a color value corresponding to each virtual scene element is obtained by the following formula:

$$\begin{cases} \text{color}_{red}(\text{index}) = (\text{index} + 1) \bmod h \\ \text{color}_{green}(\text{index}) = \left(\frac{\text{index} + 1}{h}\right) \bmod h \\ \text{color}_{blue}(\text{index}) = \left(\frac{\text{index} + 1}{h^2}\right) \bmod h \end{cases} \tag{7}$$

where index is the number of the virtual scene element, and $\text{color}_{red}(\text{index})$, $\text{color}_{green}(\text{index})$, and $\text{color}_{blue}(\text{index})$ are a color value of three primary colors RGB of the virtual scene element corresponding to the number. That is, the color value includes $color_{red}$(index), $color_{green}$(index), and $color_{blue}$(index), and mod is the remainder operation. h is a preset parameter, which may be set according to actual situations, for example, as 128, 256, 512, and the like. It may be seen from the foregoing coding formula that virtual scene elements with different numbers are coded to obtain different color values. A virtual scene element corresponds to a number, a number corresponds to a color value, and a virtual scene element corresponds to a color value. That is, a virtual scene element has a color.

During rendering, a color value of a pixel in each virtual scene element is stored to a corresponding storage position in the frame buffer according to the position of each virtual scene element under the target perspective in the virtual game scene.

In the process of storing the virtual scene elements in the frame buffer, if the position of a virtual scene element A under the target perspective is blocked by the position of a virtual scene element B under the target perspective, the color value of the pixel in the virtual scene element A stored in the frame buffer area is covered by the color value of the virtual scene element B.

In the rendering process shown in FIG. 5, color (0) is the color value of the virtual scene element A, color (1) is the color value of the virtual scene element B, including ($color_{red}$(1), $color_{green}$(1), $color_{blue}$(1)). In the rendering process of the virtual scene elements as shown in the figure, the color value of the virtual scene element A is first stored to a corresponding storage position 501 of the target storage space, and then the color value of the virtual scene element B is stored to the corresponding storage position 501 of the target storage space. Since the virtual scene element B and the virtual scene element A overlap under the target perspective at the storage position of the frame buffer, the overlapping storage position is 501, and the color value of the virtual scene element B overlaps the color value of the virtual scene element A in the frame buffer. The virtual scene element A does not exist in the rendered virtual game scene, and the color value of the scene element A does not exist in the frame buffer.

S2: Obtain a color value of each pixel in the rendered virtual game scene map, and determine a number of the virtual scene element corresponding to each pixel according to the color value.

Specifically, the number of the scene element corresponding to each pixel in the virtual game scene map may be obtained by decoding, and the decoding equation is:

$$index = color_{blue} \times h^2 + color_{green} \times h + color_{red} - 1 \quad (8)$$

where $color_{blue}$, $color_{green}$, and $color_{red}$ are the color value of the pixel, and index is the number of the scene element where the pixel is located. h is the same as h in the foregoing coding formula, which may be determined according to actual situations as, for example, 128, 256, 512, and the like.

S3: Obtain a visible virtual scene element in the virtual game scene under the target perspective according to the decoded number of the scene element.

Through the foregoing embodiment, the visible virtual scene elements under each perspective may be quickly determined in the virtual game scene, thereby improving the rendering efficiency of the virtual game scene under each perspective. When a player quickly switches a game perspective, a game picture under the corresponding perspective may be quickly switched, thereby increasing the rendering speed of the game picture and improving the game experience.

In the disclosure, a read-back visibility array is used for replacing a read-back buffer in the process of obtaining the visible set, thereby greatly improving the computational efficiency. Compatible with most of the existing graphics production processes and scalable to different operating platforms, the disclosure may be applied to different graphics rendering products in the industry. The read-back frame buffer is replaced with read-back visible set data, thereby greatly improving the efficiency, and rendering with a higher resolution during the application. Taking a frame buffer with a resolution of 4096×2048 as an example, the buffer size of an RGBA32 format is 4096×2048×4 Byte=32 MB. Assuming that 100,000 primitives are included therein, the amount of data is only 0.38 MB. In practical engineering, several or even dozens of frame buffers generated by a plurality of views of a viewpoint may call the computational shader kernel function for many times to write to the visible set repeatedly, and the amount of data finally read back to the CPU may remain unchanged. The flexibility, efficiency, and accuracy of obtaining visible sets in application are greatly improved. The disclosure may be flexibly applied in Unity 3D engines, Unreal engines, and other commercial engines, may be modified according to actual project requirements, and may be applied in the process of real-time rendering and offline computation.

To simplify the description, the foregoing method embodiments are described as a series of action combination. However, those of ordinary skill in the art may know that the disclosure is not limited to any described order of the actions, as some operations may be executed in another order simultaneously according to the disclosure. In addition, those skilled in the art may also know that all the embodiments described in the specification are only example embodiments, and the related actions and modules are not necessarily mandatory to the disclosure.

Figure 11:
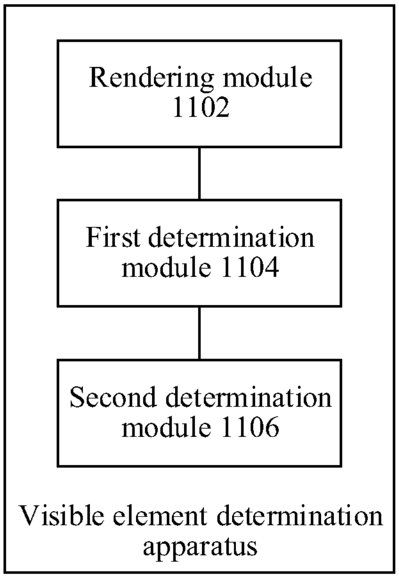
FIG. 11 is a schematic structural diagram of a visible element determination apparatus according to some embodiments.

According to another aspect of this embodiment of the disclosure, a visible element determination apparatus for implementing the visible element determination method is further provided. As shown in FIG. 11, the apparatus includes: a rendering module 1102, configured to render each scene element in a first scene element set under a target perspective to obtain a target rendering image, the first scene element set including to-be-rendered scene elements in a target scene under the target perspective, each scene element having a corresponding number, and a color value of each pixel in the target rendering image being rendered according to the number of the scene element to which each pixel belongs; a first determination module 1104, configured to determine the number of the scene element where each pixel is located according to the color value of each pixel in the target rendering image to obtain a target index set; and a second determination module 1106, configured to determine a second scene element set in the first scene element set, and determining scene elements in the second scene element set as visible elements under the target perspective, indexes of the scene elements in the second scene element set being the numbers in the target index set.

In some embodiments, the apparatus is further configured to search for scene elements within a range of the target perspective from the target scene to obtain the first scene element set before rendering each scene element in the first scene element set under the target perspective to obtain the target rendering image.

In some embodiments, in the presence of blocked scene elements in the first scene element set under the target perspective, the target rendering image includes pixels in scene elements other than the blocked scene elements in the first scene element set.

In some embodiments, the apparatus is further configured to: determine, according to the number of each scene element in the first scene element set, a color value corresponding to each scene element, the scene elements with different numbers corresponding to different color values; determine, for each scene element, a color value of the pixel in the scene element according to the color value corresponding to the scene element; and determine a corresponding storage position of each scene element in a target storage space according to a position of each scene element under the target perspective, and store the color value of the pixel in each scene element to the corresponding storage position in the target storage space, the color value of the pixel stored in the target storage space being the color value of the pixel in the target rendering image.

In some embodiments, in the presence of a first scene element and a second scene element in each scene element and in a case that the position of the first scene element under the target perspective is blocked by the position of the second scene element under the target perspective, the color value of the pixel in the first scene element stored in the target storage space is covered by the color value of the pixel in the second scene element.

In some embodiments, the apparatus is further configured to perform the following operations in which each scene element is a current scene element and a position of the current scene element under the target perspective is a current position on each scene element in the first scene element set: searching for a current storage position corresponding to the current position from the target storage space; covering, in a case that the color value of the pixel in a scene element has been stored in the current storage position, the stored color value of the pixel in the scene element into the color value of the pixel in the current scene element at the current storage position, the position of the scene element under the target perspective being blocked by the position of the current scene element under the target perspective; and storing the color value of the pixel in the current scene element to the current storage position in a case that the color value of the pixel in any scene element is not stored at the current storage position.

In some embodiments, the apparatus is further configured to perform the following operations in which each scene element is a current scene element on each scene element in the first scene element set: obtaining a number of the current scene element; and performing a logical operation on the number of the current scene element to obtain the color value corresponding to the current scene element.

In some embodiments, the apparatus is further configured to perform the following operations in which each pixel is a current pixel on the color value of each pixel stored in the target storage space: performing an inverse logical operation corresponding to the logical operation on the color value of the current pixel to obtain the number of the scene element where the current pixel is located.

In some embodiments, the apparatus is further configured to obtain the color values of the pixels in the target rendering image in parallel through a target thread set, and determine the numbers of the scene elements in which the obtained color values of the pixels are located according to the obtained color values of the pixels. The target rendering image includes a plurality of image blocks. Each thread in the target thread set is used for reading the color value of the pixel in the image block in the target rendering image every time.

In some embodiments, the visible element includes a visible primitive. The apparatus is further configured to determine, in a case that the second scene element set is a second model set and each scene element in the second scene element set is each model in the second model set, each model in the second model set as the visible model under the target perspective.

In some embodiments, the visible element includes a visible primitive. In a case that the second scene element set is a second primitive set and each scene element in the second scene element set is each primitive in the second primitive set, each primitive in the second primitive set is determined as the visible primitive under the target perspective.

In some embodiments, the apparatus is further configured to: determine, in a case that the first scene element set is a first model set and each scene element in the first scene element set is each model in the first model set, a color value corresponding to each model in the first model set according to a number of each model, the models with different numbers corresponding to different color values; and determine the target rendering image according to the color value corresponding to each model in the first model set and the position of each model under the target perspective.

In some embodiments, in a case that the first scene element set is a first primitive set and each scene element in the first scene element set is each primitive in the first primitive set, a color value corresponding to each primitive in the first primitive set is determined according to a number of each primitive. The primitives with different numbers correspond to different color values. The target rendering image is determined according to the color value corresponding to each primitive in the first primitive set and the position of each primitive under the target perspective.

In some embodiments, the apparatus is further configured to: set, in response to determining scene elements in the second scene element set as visible elements under the target perspective, a value of each unit in a first unit set corresponding to the second scene element set in a preset first array as a first value, and set a value of a unit other than the first unit set in the first array as a second value, the quantity of units in the first array being the quantity of scene elements in the first scene element set, the units in the first array and the scene elements in the first scene element set having a one-to-one correspondence relationship, the unit with the first value indicating that the corresponding scene element is the visible element under the target perspective, and the unit with the second value indicating that the corresponding scene element is an invisible element under the target perspective; and transmit the first array to a target processing device in the electronic device through the computational shader.

In some embodiments, a value of each unit in a first unit set corresponding to the second scene element set in a preset second array is set as a first value, a value of a unit other than the first unit set in a second unit set is set as a second value, and a value of a unit other than the second unit set in the second array is set as a third value. The second unit set is a unit set corresponding to the first scene element set in the second array. The second unit set includes the first unit set. The quantity of units in the second array is the quantity of scene elements in the target scene. The units in the second array and the scene elements in the target scene have a one-to-one correspondence relationship. The unit with the first value indicates that the corresponding scene element is the visible element under the target perspective, the unit with the second value indicates that the corresponding scene element is an invisible element under the target perspective, and the unit with the third value indicates that the corresponding scene element is not within the range of the target perspective. The second array is transmitted to a target processing device in the electronic device through the computational shader.

According to one aspect of the disclosure, a computer program product is provided. The computer-readable instruction product includes a computer-readable instruction. The computer-readable instruction includes a program code for performing the method shown in the flowchart. In such embodiment, the computer-readable instruction may be downloaded and installed over a network through a communication portion 1209, and/or installed from a detachable medium 1211. When the computer-readable instruction is executed by a CPU 1201, the various functions provided in this embodiment of the disclosure are performed.

The sequence numbers of the foregoing embodiments of the disclosure are merely for description purpose but do not imply the preference among the embodiments.

Figure 12:
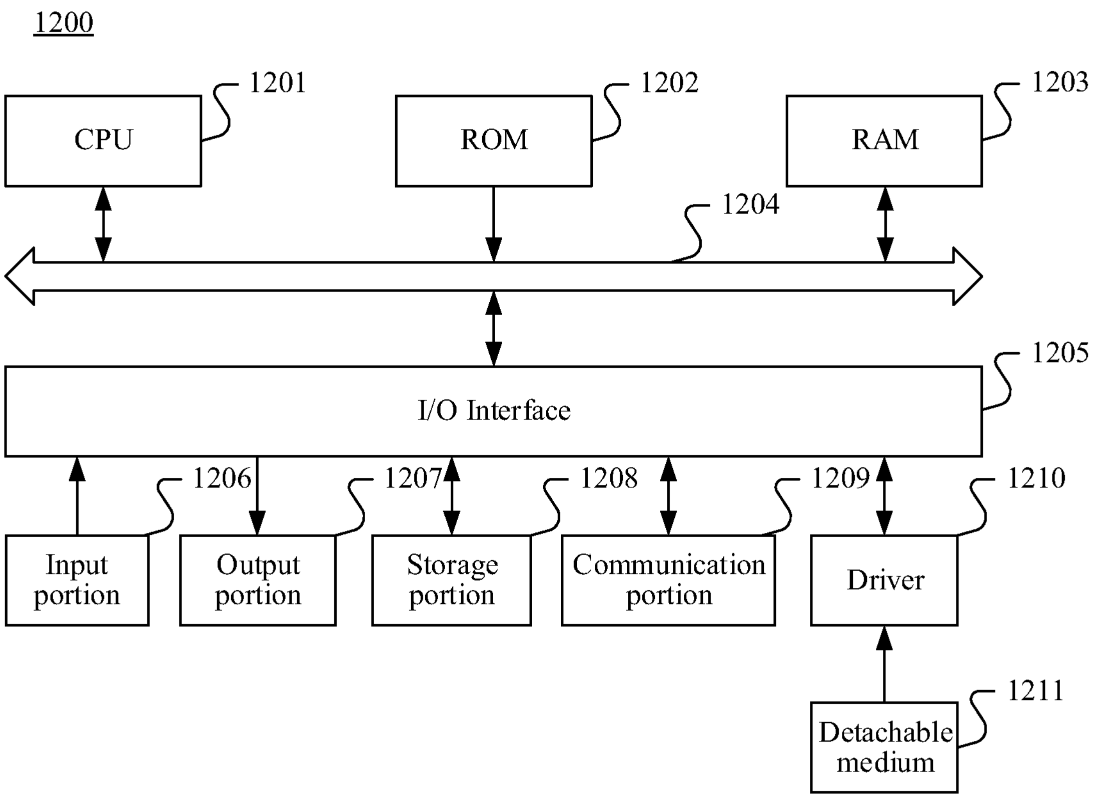
FIG. 12 is a structural block diagram of a computer system of an electronic device according to some embodiments.

FIG. 12 schematically shows a structural block diagram of a computer system configured to implement an electronic device according to an embodiment of the disclosure.

A computer system 1200 of an electronic device shown in FIG. 12 is merely an example and may not pose any limitation on the scope of functionality or use of this embodiment of the disclosure.

As shown in FIG. 12, the computer system 1200 includes the CPU 1201, which may perform various suitable actions and processing according to a program stored in a read-only memory (ROM) 1202 or a program loaded from a storage portion 1208 into a random access memory (RAM) 1203. In the RAM 1203, various programs and data required for system operation are also stored. The CPU 1201, the ROM 1202, and the RAM 1203 are connected via a bus 1204. An input/output (I/O) interface 1205 is also connected to the bus 1204.

The following components are connected to the I/O interface 1205: an input portion 1206 including a keyboard, a mouse, and the like; an output portion 1207 including, for example, a cathode ray tube (CRT), a liquid crystal display (LCD), a loudspeaker, and the like; a storage portion 1208 including a hard disk, and the like; and the communication portion 1209 including, for example, a network interface card such as a local area network card and a modem. The communication portion 1209 performs communication processing via a network such as the Internet. A driver 1210 is also connected to the I/O interface 1205 as required. The detachable medium 1211, such as a magnetic disk, an optical disk, a magneto-optical disk, or a semiconductor memory, is installed on the driver 1210 as required, whereby a computer-readable instruction read therefrom is installed into the storage portion 1208 as required.

Particularly, according to this embodiment of the disclosure, the processes described in the method flowcharts may be implemented as computer software programs. For example, this embodiment of the disclosure provides a computer program product, which includes a computer-readable instruction carried on a computer-readable medium. The computer-readable instruction includes a program code used for performing the method shown in the flowchart. In such embodiment, the computer-readable instruction may be downloaded and installed over the network through the communication portion 1209, and/or installed from the detachable medium 1211. When the computer-readable instruction is executed by the CPU 1201, the various functions defined in the system of the disclosure are performed.

Figure 1:
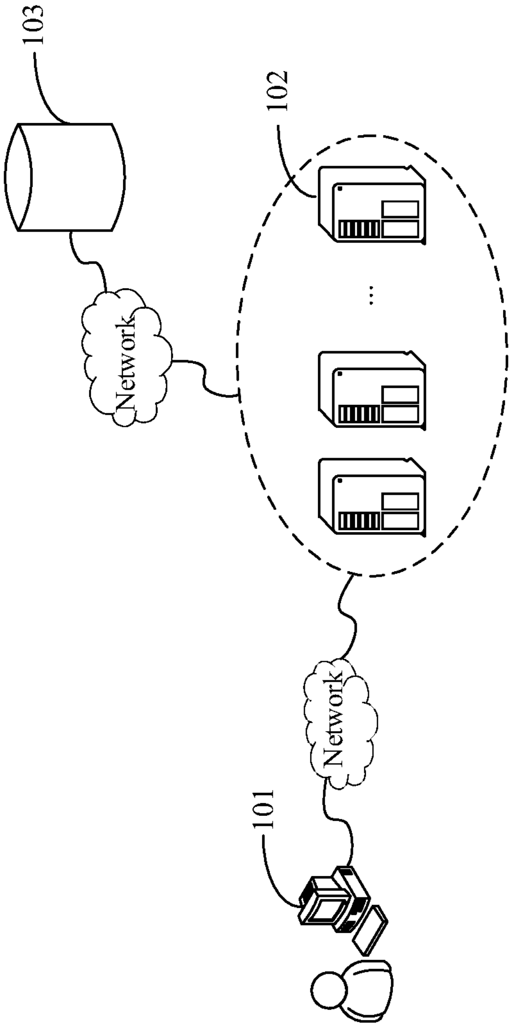
FIG. 1 is a schematic diagram of an application environment of a visible element determination method according to some embodiments.
Figure 13:
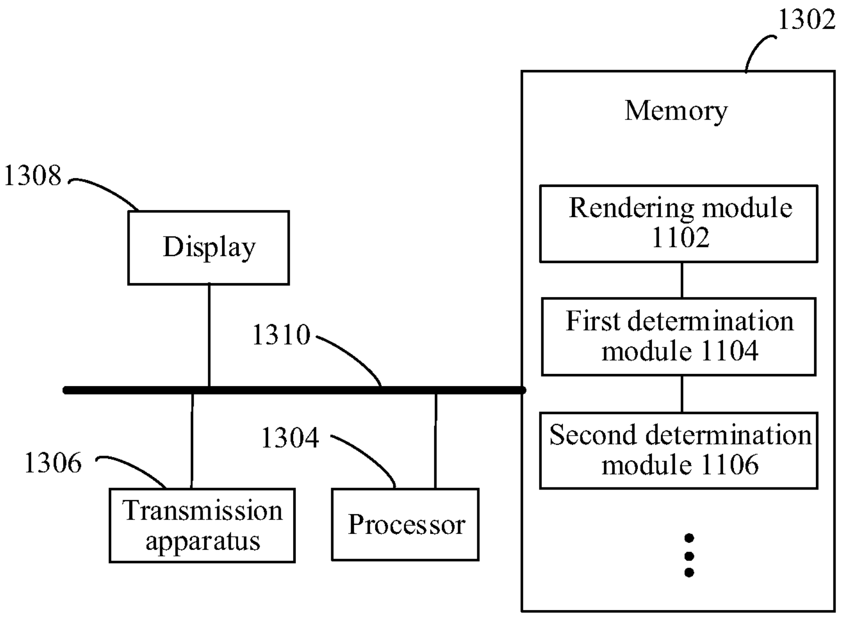
FIG. 13 is a schematic structural diagram of an electronic device according to some embodiments.

According to yet another aspect of this embodiment of the disclosure, an electronic device for implementing the visible element determination method is further provided. The electronic device may be a terminal device or a server as shown in FIG. 1. This embodiment is illustrated as the electronic device being the server. As shown in FIG. 13, the electronic device includes a memory 1302 and one or more processors 1304. A computer-readable instruction is stored in the memory 1302. The processor 1304 is configured to perform the operations in any of the method embodiments through the computer-readable instruction.

In some embodiments, the electronic device may be located in at least one network device among a plurality of network devices of a computer network.

In some embodiments, those of ordinary skill in the art may understand that the structure shown in FIG. 13 is only schematic. The electronic device may be a terminal device such as a smartphone (such as an Android mobile phone or an iOS mobile phone), a tablet computer, a palmtop computer, an MID, or a PAD. The structure of the electronic device is not limited in FIG. 13. For example, the electronic device may further include more or fewer components (such as network interfaces) than shown in FIG. 13, or have different configurations than shown in FIG. 13.

The memory 1302 may be configured to store software programs and modules, such as program instructions/modules corresponding to the visible element determination method and apparatus in this embodiment of the disclosure. The processor 1304 runs the software programs and modules stored in the memory 1302 so as to perform various functional applications and data processing, namely, implementing the visible element determination method. The memory 1302 may include a high speed random access memory and may further include a non-volatile memory, such as one or more magnetic storage apparatuses, a flash memory, or another non-volatile solid state memory. In some examples, the memory 1302 may further include memories remotely located with respect to the processor 1304. The remote memories may be connected to a terminal via a network. Examples of the network include, but are not limited to, the Internet, Intranet, local area networks, mobile communication networks, and combinations thereof. The memory 1302 may be specifically configured to store information such as scene elements, but is not limited thereto. As an example, as shown in FIG. 13, the memory 1302 may include, but is not limited to, the rendering module 1102, the first determination module 1104, and the second determination module 1106 in the visible element determination apparatus. In addition, the apparatus may further include, but is not limited to, other module units in the visible element determination apparatus.

In some embodiments, a transmission apparatus 1306 is configured to receive or transmit data via a network. Specific examples of the network may include a wired network and a wireless network. In one example, the transmission apparatus 1306 includes a network interface controller (NIC), which may be connected to another network device and router via a network cable so as to communicate with the Internet or a local area network. In one example, the transmission apparatus 1306 is a radio frequency (RF) module for communicating wirelessly with the Internet.

In addition, the electronic device further includes: a display 1308, configured to display visible scene elements;

and a connection bus 1310, configured to connect the various module components in the electronic device.

In other embodiments, the terminal device or the server may be a node in a distributed system. The distributed system may be a blockchain system. The blockchain system may be a distributed system formed of multiple blockchain nodes connected by network communication. A peer to peer (P2P) network may be formed between the nodes. Any form of computing device, such as a server, a terminal, and other electronic devices, may become a node in the blockchain system by joining the P2P network.

According to one aspect of the disclosure, one or more computer-readable storage media are provided. A processor of a computer device reads a computer-readable instruction from the one or more computer-readable storage media. The one or more processors execute the computer-readable instruction to cause the computer device to perform the method provided in various optional implementations.

In some embodiments, those of ordinary skill in the art may understand that all or some of the operations of the methods in the foregoing embodiments may be implemented by a program instructing relevant hardware. The program may be stored in a computer-readable storage medium. The storage medium may include: a flash disk, a ROM, a RAM, a magnetic or optical disk, and the like.

If the unit integrated in the foregoing embodiments is implemented in the form of a software functional unit and sold or used as an independent product, the unit may be stored in the computer-readable storage medium. Based on this understanding, the technical solution of the disclosure, either inherently or in any part contributing to the related art, or all or part of the technical solution, may be embodied in the form of a software product. The computer software product is stored in the storage medium, and includes several instructions for causing one or more computer devices (which may be a personal computer, a server, or a network device) to perform all or part of the operations of the methods according to the various embodiments of the disclosure.

In the foregoing embodiments of the disclosure, the description of each embodiment is emphasized separately, and reference may be made to the relevant description of other embodiments for the parts of one embodiment that are not described in detail.

In several embodiments provided in the disclosure, it is to be understood that the disclosed client may be implemented in other manners. The apparatus embodiments described above are merely examples. For example, division into the units is merely logical function division, and may be another division in an actual implementation. For example, multiple units or assemblies may be combined or may be integrated into another system, or some features may be ignored or not be performed. In addition, the displayed or discussed mutual couplings or direct couplings or communication connections may be implemented by using some interfaces. The indirect couplings or communication connections between the units or the modules may be electrical or in other forms.

The units described as separate components may or may not be physically separated, and components displayed as units may or may not be physical units, may be located in one position, or may be distributed over multiple network units. Some or all of the units may be selected based on actual requirements to achieve the objects of the solutions of this embodiment.

In addition, functional units in the various embodiments of the disclosure may be integrated into one processing unit, the units may exist alone physically, or two or more units may be integrated into one unit. The integrated unit may be implemented in the form of hardware, or may be implemented in the form of a software functional unit.

The above descriptions are example implementations of the disclosure. Those of ordinary skill in the art may make numerous improvements and modifications without departing from the principle of the disclosure. These improvements and modifications shall fall within the scope of protection of the disclosure.

What is claimed is:

1. A visible element determination method, performed by at least one processor of an electronic device and comprising:

rendering each scene element in a first scene element set under a target perspective to obtain a target rendering image, the first scene element set comprising to-be-rendered scene elements in a target scene under the target perspective, each scene element in the first scene element set having a corresponding index, and a color value of each pixel in the target rendering image being rendered according to an index of a scene element to which each pixel belongs, wherein the rendering each scene element in the first scene element set comprises:

determining, according to the index of each scene element in the first scene element set, a color value corresponding to each scene element, the scene elements with different indexes corresponding to different color values;

determining, for each scene element, a color value of the pixel in the scene element according to the color value corresponding to the scene element;

determining a corresponding storage position of each scene element in a target storage space according to a position of each scene element under the target perspective; and storing the color value of the pixel in each scene element to the corresponding storage position in the target storage space, the color value of the pixel stored in the target storage space being the color value of the pixel in the target rendering image, and wherein the target rendering image comprises pixels in scene elements other than blocked scene elements in the first scene element set;

determining the index of the scene element to which each pixel belongs according to the color value of each pixel in the target rendering image, to obtain a target index set;

determining a second scene element set in the first scene element set; and determining scene elements in the second scene element set as visible elements under the target perspective, the indexes of the scene elements in the second scene element set being included in indexes in the target index set.

2. The method according to claim 1, wherein before the rendering each scene element in the first scene element set, the method further comprises:

searching for scene elements within a range of the target perspective from the target scene to obtain the first scene element set.

3. The method according to claim 1, wherein in the presence of a first scene element and a second scene element in each scene element and based on the position of the first scene element under the target perspective being blocked by the position of the second scene element under the target perspective, the color value of the pixel in the first scene element stored in the target storage space is covered by the color value of the pixel in the second scene element.

4. The method according to claim 3, wherein the determining the corresponding storage position of each scene element comprises:

searching for a current storage position corresponding to the current position from the target storage space;

covering, based on the color value of the pixel in a scene element being stored in the current storage position, the stored color value of the pixel in the scene element into the color value of the pixel in the current scene element at the current storage position, the position of the scene element under the target perspective being blocked by the position of the current scene element under the target perspective; and storing the color value of the pixel in the current scene element to the current storage position based on the color value of the pixel in any scene element not being stored at the current storage position.

5. The method according to claim 1, wherein the determining the color value corresponding to each scene element comprises:

obtaining an index of the current scene element; and performing a logical operation on the index of the current scene element to obtain the color value corresponding to the current scene element.

6. The method according to claim 5, wherein the determining the index of the scene element to which each pixel belongs comprises:

performing an inverse logical operation corresponding to the logical operation on the color value of the current pixel to obtain the index of the scene element where the current pixel is located.

7. The method according to claim 1, wherein the determining the index of the scene element to which each pixel belongs comprises:

obtaining color values of the pixels in the target rendering image in parallel through a target thread set; and determining the indexes of the scene elements in which the obtained color values of the pixels are located according to the obtained color values of the pixels, the target rendering image comprising a plurality of image blocks, and each thread in the target thread set being used for reading the color value of the pixel in an image block in the target rendering image every time.

8. The method according to claim 1, wherein the rendering each scene element in the first scene element set comprises:

determining, based on the first scene element set being a first model set and each scene element in the first scene element set being each model in the first model set, a color value corresponding to each model in the first model set according to an index of each model, the models with different indexes corresponding to different color values; and determining the target rendering image according to the color value corresponding to each model in the first model set and the position of each model under the target perspective.

9. The method according to claim 1, wherein the rendering each scene element in the first scene element set comprises:

determining, based on the first scene element set being a first primitive set and each scene element in the first scene element set being each primitive in the first primitive set, a color value corresponding to each primitive in the first primitive set according to an index of each primitive, the primitives with different indexes corresponding to different color values; and determining the target rendering image according to the color value corresponding to each primitive in the first primitive set and the position of each primitive under the target perspective.

10. The method according to claim 1, wherein the visible element comprises a visible model; and the determining scene elements in the second scene element set comprises:

determining, based on the second scene element set being a second model set and each scene element in the second scene element set being each model in the second model set, each model in the second model set as the visible model under the target perspective.

11. The method according to claim 1, wherein the visible element comprises a visible primitive; and the determining scene elements in the second scene element set comprises:

determining, based on the second scene element set being a second primitive set and each scene element in the second scene element set being each primitive in the second primitive set, each primitive in the second primitive set as the visible primitive under the target perspective.

12. The method according to claim 1, wherein in response to determining scene elements in the second scene element set as visible elements under the target perspective, the method further comprises:

setting a value of each unit in a first unit set corresponding to the second scene element set in a preset first array as a first value; and setting a value of a unit other than the first unit set in the first array as a second value, a quantity of units in the first array being a quantity of scene elements in the first scene element set, the units in the first array and the scene elements in the first scene element set having a one-to-one correspondence relationship, the unit with the first value indicating that the corresponding scene element is the visible element under the target perspective, and the unit with the second value indicating that the corresponding scene element is an invisible element under the target perspective; and transmitting the first array to a target processing device in the electronic device through a computational shader.

13. The method according to claim 1, wherein in response to determining scene elements in the second scene element set as visible elements under the target perspective, the method further comprises:

setting a value of each unit in a first unit set corresponding to the second scene element set in a preset second array as a first value;

setting a value of a unit other than the first unit set in a second unit set as a second value;

setting a value of a unit other than the second unit set in the second array as a third value, the second unit set being a unit set corresponding to the first scene element set in the second array, the second unit set comprising the first unit set, a quantity of units in the second array being a quantity of scene elements in the target scene, the units in the second array and the scene elements in the target scene having a one-to-one correspondence relationship, the unit with the first value indicating that the corresponding scene element is the visible element under the target perspective, the unit with the second value indicating that the corresponding scene element is an invisible element under the target perspective, and the unit with the third value indicating that the corresponding scene element is not within the range of the target perspective; and transmitting the second array to a target processing device in the electronic device through the computational shader.

14. A visible element determination apparatus, comprising:

at least one memory configured to store program code; and at least one processor configured to read the program code and operate as instructed by the program code, the program code comprising:

rendering code configured to cause the at least one processor to render each scene element in a first scene element set under a target perspective to obtain a target rendering image, the first scene element set comprising to-be-rendered scene elements in a target scene under the target perspective, each scene element in the first scene element set having a corresponding index, and a color value of each pixel in the target rendering image being rendered according to an index of a scene element to which each pixel belongs, wherein the rendering code is further configured to cause the at least one processor to:

determine, according to the index of each scene element in the first scene element set, a color value corresponding to each scene element, the scene elements with different indexes corresponding to different color values;

determine, for each scene element, a color value of the pixel in the scene element according to the color value corresponding to the scene element;

determine a corresponding storage position of each scene element in a target storage space according to a position of each scene element under the target perspective; and store the color value of the pixel in each scene element to the corresponding storage position in the target storage space, the color value of the pixel stored in the target storage space being the color value of the pixel in the target rendering image, and wherein the target rendering image comprises pixels in scene elements other than blocked scene elements in the first scene element set;

first determination code configured to cause the at least one processor to determine the index of the scene element to which each pixel belongs according to the color value of each pixel in the target rendering image to obtain a target index set;

second determination code configured to cause the at least one processor to determine a second scene element set in the first scene element set; and third determination code configured to cause the at least one processor to determine scene elements in the second scene element set as visible elements under the target perspective, indexes of the scene elements in the second scene element set being included in indexes in the target index set.

15. The apparatus according to claim 14, wherein the program code further comprises:

searching code configured to cause the at least one processor to search for scene elements within a range of the target perspective from the target scene to obtain the first scene element set.

16. A non-transitory computer-readable storage medium, storing a computer program that when executed by at least one processor causes the at least one processor to:

render each scene element in a first scene element set under a target perspective to obtain a target rendering image, the first scene element set comprising to-be-rendered scene elements in a target scene under the target perspective, each scene element in the first scene element set having a corresponding index, and a color value of each pixel in the target rendering image being rendered according to an index of a scene element to which each pixel belongs;

wherein the rendering each scene element in the first scene element set comprises:

determining, according to the index of each scene element in the first scene element set, a color value corresponding to each scene element, the scene elements with different indexes corresponding to different color values;

determining, for each scene element, a color value of the pixel in the scene element according to the color value corresponding to the scene element;

determining a corresponding storage position of each scene element in a target storage space according to a position of each scene element under the target perspective; and storing the color value of the pixel in each scene element to the corresponding storage position in the target storage space, the color value of the pixel stored in the target storage space being the color value of the pixel in the target rendering image, and wherein the target rendering image comprises pixels in scene elements other than blocked scene elements in the first scene element set;

determine the index of the scene element to which each pixel belongs according to the color value of each pixel in the target rendering image to obtain a target index set;

determine a second scene element set in the first scene element set; and determine scene elements in the second scene element set as visible elements under the target perspective, indexes of the scene elements in the second scene element set being included in indexes in the target index set.

* * * * *